United States Patent
Sherman et al.

(10) Patent No.: US 7,655,283 B2
(45) Date of Patent: Feb. 2, 2010

(54) RIGID OPTICAL LAMINATES AND METHODS OF FORMING THE SAME

(75) Inventors: Audrey A. Sherman, St. Paul, MN (US); Scott M. Tapio, Falcon Heights, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 588 days.

(21) Appl. No.: 11/426,844

(22) Filed: Jun. 27, 2006

(65) Prior Publication Data

US 2007/0297736 A1 Dec. 27, 2007

(51) Int. Cl.
*C09K 19/00* (2006.01)
*C09K 19/06* (2006.01)
*C09K 19/52* (2006.01)
*G02B 6/10* (2006.01)

(52) U.S. Cl. .................. 428/1.1; 252/299.01; 430/20; 385/129

(58) Field of Classification Search ............ 252/299.01; 428/1.1; 430/20; 385/129
See application file for complete search history.

(56) References Cited

U.S. PATENT DOCUMENTS

| | | |
|---|---|---|
| 5,141,790 A | 8/1992 | Calhoun et al. |
| 5,214,119 A | 5/1993 | Leihr et al. |
| 5,268,228 A | 12/1993 | Orr |
| 5,296,277 A | 3/1994 | Wilson et al. |
| 5,362,516 A | 11/1994 | Wilson et al. |
| 5,407,971 A | 4/1995 | Everaerts et al. |
| 5,475,124 A | 12/1995 | Mazurek et al. |
| 5,514,730 A | 5/1996 | Mazurek et al. |
| 5,527,578 A * | 6/1996 | Mazurek et al. ............ 428/41.8 |
| 6,123,890 A | 9/2000 | Mazurek et al. |
| 6,197,397 B1 | 3/2001 | Sher et al. |
| 6,369,123 B1 | 4/2002 | Stark et al. |
| 6,585,939 B1 | 7/2003 | Dapprich |
| 6,790,526 B2 | 9/2004 | Vargo et al. |
| 6,908,760 B2 | 6/2005 | Cima et al. |
| 7,258,437 B2 * | 8/2007 | King et al. .................. 351/164 |

FOREIGN PATENT DOCUMENTS

JP 200518957 1/2005

OTHER PUBLICATIONS

U.S. Appl. No. 11/222,284, filed Sep. 8, 2005, and incorporated.
U.S. Appl. No. 11/317,602, filed Dec. 23, 2005, and incorporated.

* cited by examiner

*Primary Examiner*—Geraldina Visconti
(74) *Attorney, Agent, or Firm*—Elizabeth A. Gallo (57) ABSTRACT

An optical article and method or forming an optical article are disclosed. The optical article includes a first rigid optical substrate, a second rigid optical substrates and a self-supporting optical adhesive disposed between the first rigid substrate and the second rigid substrate. The self-supporting optical adhesive includes a cross-linked silicone based polymer network and a silicone fluid disposed in the polymer network.

20 Claims, 1 Drawing Sheet

RIGID OPTICAL LAMINATES AND METHODS OF FORMING THE SAME

BACKGROUND

The present disclosure relates generally to rigid optical laminates and methods of forming the same.

Optical articles are often formed of rigid optical elements. These rigid optical elements are often placed together with an air gap disposed between the two rigid optical elements. An air/rigid optical element interface often has a refractive index difference that can lead to optical losses at that air/rigid optical element interface.

Anti-reflective coating layers are applied at these air/rigid optical element interfaces to reduce optical losses. However, these coatings are often expensive and do not completely eliminate the effect of the air gaps.

Laminating rigid optical elements to one another with a pressure sensitive adhesive between the rigid optical elements is a difficult proposition, and often leads to visible air bubbles between the rigid optical elements. These air bubbles again lead to optical losses.

SUMMARY

In one exemplary implementation, the present disclosure is directed to an optical article. The optical article includes a first rigid optical substrate, a second rigid optical substrate, and a self-supporting optical adhesive disposed between the first rigid substrate and the second rigid substrate. The self-supporting optical adhesive includes a cross-linked silicone based polymer network and a silicone fluid disposed in the polymer network.

In another exemplary implementation, the present disclosure is directed to a method of forming an optical article. The method includes providing a first rigid optical substrate having a surface and a self-supporting optical adhesive layer disposed adjacent the surface, and laminating a second rigid substrate onto the self-supporting optical adhesive layer to form an optical article. The self-supporting optical adhesive layer is disposed between the first rigid optical substrate and the second optical substrate and the self-supporting optical adhesive includes a cross-linked silicone based polymer network and a silicone fluid disposed in the polymer network.

These and other aspects of the optical film stacks and liquid crystal display devices according to the subject invention will become readily apparent to those of ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, in which.

DETAILED DESCRIPTION

The present disclosure is directed generally to rigid optical laminates and methods of forming the same, and particularly to self-supporting optical adhesives that include a cross-linked silicone based polymer network and a silicone fluid at least partially disposed within the polymer network, forming a self-supporting repositionable optical adhesive that allows rigid optical elements to be self-laminated to one another. While the present invention is not so limited, an appreciation of various aspects of the invention will be gained through a discussion of the examples provided below.

The self-supporting adhesive described herein has been found to be a practical way to fill an air gap often found between rigid optical substrates such as, for example, liquid crystal displays and overlaying sensor or protective panels. These self-supporting adhesives have the ability to self-wet, and allow for air/bubble free rigid-to-rigid laminations without high pressure lamination equipment. These self-supporting adhesives are able to fill air gaps usually present in optical articles that have adjacent rigid substrates to improve overall optical performance.

The self-supporting adhesive described herein can optically couple the adjacent rigid substrates as the self-supporting adhesive self-laminates the two rigid substrates together. Filling an air gap between rigid optical substrates with the self-supporting adhesive described herein increases transmission and reduces glare by eliminating the dramatic refractive index mismatches at the two rigid substrate/air interfaces. In addition, filling an air gap between rigid optical substrates with the self-supporting adhesive described herein can eliminate the need to apply anti-reflective coatings onto the two rigid substrates.

The self-supporting adhesive described herein can also allow for temporary or permanent re-positionablity of one rigid substrate relative to the other rigid substrate by delaminating one or both of the rigid substrates from the self-supporting adhesive described herein. Permanently bonding two rigid optical substrates such as, for example, an LCD display and a rigid protective cover, required replacement of the entire LCD display if the rigid protective cover was scratched, damaged, or improperly assembled. The self-supporting adhesive described herein allows these scratched, damaged, or improperly assembled optical articles to be repaired by simply removing the rigid substrate via the self-supporting adhesive described herein and, if desired, self-laminating a replacement rigid substrate using the described self-supporting adhesive.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof.

The term "optical film" or "optical substrate" refers to films or substrates that are used in optical applications. Optical applications include, for example, window fills, optical displays. These films or substrates manage light passing through them.

The term "rigid substrate" refers to a single or multiple layer substrate that does not easily bend. For example, a rigid substrate does not form a "peel front" when being removed in a peel adhesion test method. In many embodiments, a rigid substrate is unable to elastically bend in a manner sufficient to perform a peel adhesion test method (usually requiring at least a 45 degree bend). One example of a rigid substrate is a glass layer having a thickness of one millimeter or greater. An LCD display panel is an example of an article including a rigid substrate. A rigid substrate can also be formed from multiple flexible layers that are laminated together in such a way as to become a rigid body, although multiple layer rigid substrates will often include a rigid layer as one of the layers.

Figure 1:
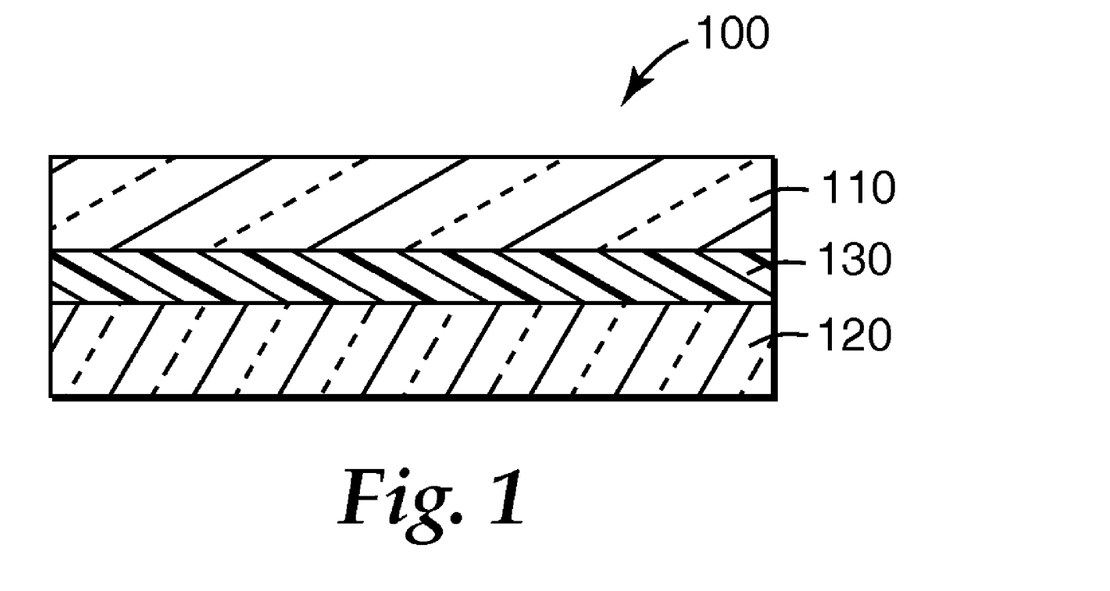
FIG. 1 is a schematic cross-sectional view of an illustrative optical article.

FIG. 1 is a schematic cross-sectional view of an illustrative optical article 100. The optical article 100 includes a first rigid optical substrate 110, a second rigid optical substrate 120, and a self-supporting optical adhesive 130 disposed between the first rigid substrate 110 and the second rigid substrate 120. The self-supporting optical adhesive 130 includes a cross-linked silicone based polymer network and a silicone fluid at least partially disposed within the polymer network.

This self-supporting optical adhesive 130 exhibits fast wetting forces between rigid optical substrate 110, 120 and provides an air/bubble free laminate. In many embodiments, these self-supporting optical adhesives 130 allow for residue-free removal. In many embodiments, these self-supporting optical adhesives 130 are permanently repositionable to allow for removal at a later time. These self-supporting optical adhesives 130 can pull a wetting front across a surface of a rigid optical substrate without applied external pressure (other than gravity).

In some embodiments, these self-supporting optical adhesives 130 include a micro-replicated adhesive surface, as further described below. A micro-replicated adhesive surface can act as fluid or air bleed channels that allow fluid or air to bleed out from between the rigid optical substrates 110, 120 as the defect-free lamination process proceeds. In many embodiments, the micro-replicated adhesive surface deforms during the lamination process to conform to the surface topography, deforming the micro-replicated adhesive layer.

In many embodiments, the cross-linked silicone based polymer network includes a silicone polyacrylate, a silicone elastomer such as, for example, a silicone polyurea elastomer or silicone polyoxamide, or mixtures thereof.

Silicone polyacrylates can be prepared by reacting a methacryloxyurea siloxane (MAUS—a difunctional silicone acrylate described in U.S. Pat. No., 5,514,730) with a vinyl monomer such as, for example, an ester of acrylic acid having from 8 to 22 carbon atoms. In many embodiments, these silicone polyacrylates include a multifunctional ethylenically unsaturated siloxane polymer, a monofunctional ethylenically unsaturated siloxane macromer, and a vinyl monomer. Useful silicone polyacrylates are described in U.S. patent application Ser. No. 11/222,284, filed on 8 Sep. 2005, and incorporated herein to the extent it does not conflict.

Silicone elastomers having polar moieties such as, for example, silicone polyureas (as described in U.S. Pat. No. 5,475,124, incorporated by reference herein) and radiation curable silicones (as described in U.S. Pat. No. 5,214,119, incorporated by reference herein) have silicone moieties that can concentrate at a low energy surface of the adhesive and form a siloxane-rich surface which has low adhesion. Once these silicone elastomers are laminated to another substrate, the siloxane moieties can migrate away from the siloxane-rich surface and allow adhesion between the adhesive (non-silicone polar moieties) and substrate to build over time.

However, these elastomers can be cross-linked (as described below) to minimize adhesion build, as desired. Silicone elastomers having polar moieties can optionally include additives such as, plasticizers, antioxidants, U.V. stabilizers, dyes, pigments, HALS, and the like.

The self-supporting optical adhesive includes a useful amount of silicone elastomer. In many embodiments, the self-supporting optical adhesive includes 20 to 80% wt silicone elastomer.

Silicone polyoxamide elastomers can also be referred to as a polydiorganosiloxane polyoxamide. These elastomers can be linear, block copolymers formed by reacting a diamine with a polydiorganosiloxane precursor having oxalylamino groups. In many embodiments, the polydiorganosiloxane polyoxamide block copolymers are of the $(AB)_n$ type. Useful silicone polyoxamide elastomers are described in U.S. patent application Ser. No. 11/317602, filed on 23 Dec. 2005, and incorporated herein to the extent it does not conflict.

In many embodiments, a cross-linker is added to these self-supporting optical adhesives and then these adhesives are cross-linked to minimize adhesion build and create a stable polymer network for the incorporation of the silicone fluid. The cross-linker can be any useful compatible cross-linker such as, for example a thermal or radiation initiated cross-linker. Cross-linker can be included in any useful cross-linking amount. In many embodiments the cross-linker is included in the initial adhesive composition in a range from 0.1 to 5% wt.

Illustrative cross-linkers include free radical curatives such as, for example, organic peroxides and hydroperoxides. Further cross-linkers include photoinitiators such as, for example, benzoin ethers, benzophenone and derivatives thereof. Other suitable crosslinkers include those described in commonly owned U.S. Pat. No. 6,369,123, and U.S. Pat. No. 5,407,971. Crosslinking may also be achieved using high energy electromagnetic radiation such as gamma or e-beam radiation.

The self-supporting optical adhesive includes a useful amount of silicone fluid. In many embodiments, the self-supporting optical adhesive includes 20 to 50% wt silicone fluid. In many embodiments, the silicone fluid is disposed within the polymer network. In many cases, one can determine whether silicone fluid is disposed in the polymer network by using common solvent extraction techniques on the polymer network.

Useful silicone fluids are compatible with the silicone based polymer network, such that the fluid does not phase separate. However, one of skill in the art can often phase separate the silicone fluid from the polymer network, if needed, by common solvent extraction techniques. Useful silicone fluids typically have a number average molecular weight of at least about 150 g/mole and more preferably at least about 500 g/mole. In many embodiments, the molecular weight of the fluid is less than 100,000 g/mole, or less than about 50,000 g/mole, or in some embodiments less than about 30,000 g/mole. The molecular weight of the fluid may be measured or reported by the supplier (e.g. GE Silicones, Waterford, N.Y.).

In some embodiments, the fluid is a silicone oil. Representative silicone oils include but are not limited to trialkylsiloxy terminated polydimethylsiloxane, polyphenylmethylsiloxane, polydialkylsiloxane, as well as copolymers of such with trialkylsiloxy terminated species. Various combinations of fluids can be used if desired.

These fluids can be combined with the silicone based polymer network by any useful method. In some embodiments, these fluids are blended with the silicone based polymer network and then coated to form a self-supporting layer. In other embodiments, the fluid is simply coated onto a surface of the silicone based polymer network that has already formed a self-supporting layer. This fluid layer disperses into the surface of the silicone based polymer network self-supporting layer.

In other embodiments, a fluid may be placed on the surface of one or both of the rigid substrates and/or on the surface of the self-supporting layer. In these embodiments, a fluid may also be blended with the silicone based polymer network. Any fluid blended with the silicone based polymer network may be the same or different from the fluid applied to the rigid substrate(s) and/or on the surface of the self-supporting layer. The fluid applied to the rigid substrate(s) and/or on the surface of the self-supporting layer, is generally at least partially absorbed by the silicone based polymer network of the self-supporting layer. In many embodiments, the fluid is a silicone fluid (as described above).

The first rigid optical substrate 110 and the second rigid optical substrate 120 can be formed of any useful rigid optical material. In many embodiments, the first rigid optical substrate 110 and the second rigid optical substrate 120 can be glass, quartz, sapphire, and the like, or polymeric material such as, for example, polycarbonate. PMMA, polyester, and the like.

In some embodiments, the second rigid optical substrate 120 forms at least a portion of a liquid crystal display panel and the first rigid optical substrate 110 forms at least a portion of a transparent sensor panel such as, for example, a touchscreen. The self-supporting adhesive described herein has been found to be a practical way to fill an air gap often found between rigid optical substrates such as liquid crystal displays and overlaying sensor panels. These self-supporting adhesives have a unique ability to self-wet, as described above and allow for air/bubble free rigid-to-rigid laminations without high pressure lamination equipment. These self-supporting adhesives are able to fill air gaps usually present in optical articles that have adjacent rigid substrates. The self-supporting adhesive described herein can optically couple the adjacent rigid substrates as the self-supporting adhesive self-laminates the two rigid substrates. The self-supporting adhesive described herein can also allow for temporary or permanent re-positionablity of one rigid substrate relative to the other rigid substrate by delaminating one or both of the rigid substrates from the self-supporting adhesive described herein.

Figure 2:
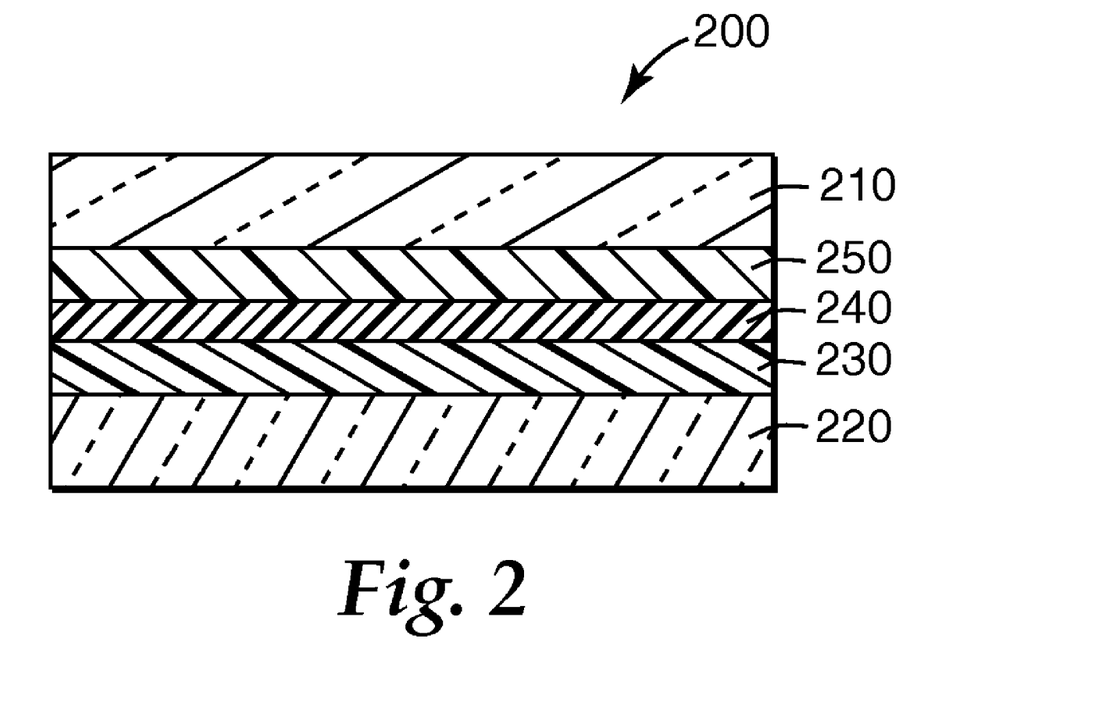
FIG. 2 is a schematic cross-sectional view of another illustrative optical article.

FIG. 2 is a schematic cross-sectional view of another illustrative optical article 200. The optical article 200 includes a first rigid optical substrate 210, a second rigid optical substrate 220, and a self-supporting optical adhesive 230 disposed between the first rigid substrate 210 and the second rigid substrate 220. The self-supporting optical adhesive 230 includes a cross-linked silicone based polymer network and a silicone fluid at least partially disposed within the polymer network, as described above.

An optical film 240 (or third rigid substrate 240) is disposed on the self-supporting optical adhesive 230 and a second optical adhesive 250 is disposed on the optical film 240. In many embodiments, the second optical adhesive 250 is a structural adhesive that cures or cross-links to a permanent bond fixing the optical film 240 to the first rigid optical substrate 210. In other embodiments, the second optical adhesive 250 is a pressure sensitive adhesive that bonds the optical film 240 to the first rigid optical substrate 210 with a greater bond strength then the bond strength of the self-supporting optical adhesive 230 to the second rigid substrate 220.

In many optical display applications, the first rigid optical substrate 210 such as, for example a touchscreen or other sensor panel, or a protective cover, can be removable from the second rigid substrate 220 such as, for example, a liquid crystal display panel or cell, and replaced with a replacement first rigid optical substrate 210 such as, for example a touchscreen or other sensor panel, or a protective cover.

In one illustrative embodiment, the self-supporting adhesive described herein is utilized in a tablet PC that can include, for example, an LCD panel and a transparent sensor layer over the LCD, an LCD panel and/or a protective cover over the LCD, or an LCD panel having a transparent sensor layer the LCD and a protective cover over the transparent sensor panel. Tablet PCs are generally provided with an active or passive stylus that can interact with a position sensor, which may be positioned over the LCD or under the LCD. When the sensor element is positioned below the LCD, a transparent protective cover can be provided over the LCD to protect the LCD from damage. Then the sensor element is a transparent LCD overlay, either the transparent sensor itself or a separate cover layer can provide protection to the LCD. The self-supporting adhesive described herein can be disposed between anti of these rigid optical substrates and can allow for relatively easy removal of the transparent sensor panel and/or the protective cover, as desired. For example, if an overlay sensor panel fails, or if the sensor overlay or protective cover becomes overly scratched or damaged, the sensor panel or protective cover can be simply replaced since the self-supporting adhesive described herein allows for permanent repositionability of the adhered rigid optical elements.

In manly embodiments, the optical articles described herein can have a haze value of 15% or less, 10% or less, 5% or less, 3% or less, or 1% or less, or 0 to 1%. In many embodiments, the optical articles described herein can have a visible light transmission in a range of 70% or greater, 80% or greater, 90% or greater, or 95% or greater. Haze and visible light transmission values can be measured as defined in the Test Methods section below.

The optical film can be any material that possesses the optical properties described above. In some embodiments, the optical substrate can be any polymeric material. A partial listing of these polymers include for example, polyolefin, polyacrylates, polyesters polycarbonates, fluoropolymers and the like. One or more polymers can be combined to form the polymeric optical film.

In some embodiments, the self-supporting adhesives, described herein, can have at least one major surface having a smooth surface. In other embodiments, the adhesive can be a layer having at least one major surface with a structured topography. The microstructures on the surface of the adhesive layer can have specific shapes that allow egress of air or other fluids trapped at the interface between the self-supporting adhesive and a rigid substrate during the lamination or self lamination process.

The microstructures on the adhesive layer (and corresponding microstructures on a release liner) can be microscopic in at least two dimensions. The term microscopic as used herein refers to dimensions that are difficult to resolve by the human eye without aid of a microscope. One useful definition of microscopic is, wherein visual acuity is defined and measured in terms of the angular size of the smallest character that can be recognized. Normal visual acuity allows detection of a character that subtends an angular height of 5 minutes of arc on the retina.

The microstructures in the self-supporting adhesive layer may be made as described in U.S. Pat. Nos. 5,268,228, 6,197,397 and 6,123,890, which are each incorporated herein by reference. The topography may be created in the adhesive layer by any contacting technique, such as casting, coating, embossing, or compressing. The topography may be made by at least one of: (1) casting the adhesive layer on a tool with an embossed pattern, (2) coating the adhesive layer onto a release liner with an embossed pattern, or (3) passing the adhesive layer through a nip roll to compress the adhesive against a release liner with an embossed pattern. The topography of the tool used to create the embossed pattern may be made using any known technique, such as, for example, chemical etching, mechanical etching, laser ablation, photolithography, stereolithography, micromachining, knurling, cutting or scoring.

A liner can be disposed on the self-supporting adhesive layer or microstructured adhesive layer and may be any release liner or transfer liner known to those skilled in the art that in some cases are capable of being embossed as described above. The liner can be capable of being placed in intimate contact with an adhesive and subsequently removed without damaging the adhesive layer. Non-limiting examples of liners include materials from 3M Company of St. Paul, Minn., Loparex, Willowbrook Ill., P.S Substrates, Inc., Schoeller Technical Papers, Inc., AssiDoman Inncoat GMBH, and P. W. A. Kunstoff GMBH. The liner can be a polymer-coated paper with a release coating, a polyethylene coated polyethylene terephthalate (PET) film with release coatings, or a cast polyolefin film with a release coating. The adhesive layer and/or release liner may optionally include additional non-adhesive microstructures such as, for example, those described in U.S. Pat. Nos. 5,296,277; 5,362,516; and 5,141,790. These microstructured adhesive layers with nonadhesive microstructures are available from 3M Company, St. Paul, Minn., under the trade designation CONTROLTAC PLUS™.

The microstructures may form a regular or a random array or pattern. Regular arrays or patterns include, for example, rectilinear patterns, polar patterns, cross-hatch patterns, cube-corner patterns. The patterns may be aligned with the direction of the carrier web, or may be aligned at an angle with respect to the carrier web. The pattern of microstructures may optionally reside on both major, opposing surfaces of the adhesive layer. This allows individual control of air egress and surface area of contact for each of the two surfaces to tailor the properties of the adhesive to two different interfaces.

The pattern of microstructures can define substantially continuous open pathways or grooves that extend into the adhesive layer from an exposed surface. The pathways either terminate at a peripheral portion of the self-supporting adhesive layer or communicate with other pathways that terminate at a peripheral portion of the article. When the microstructured self-supporting adhesive layer is applied to a rigid optical substrate, the pathways allow egress of fluids trapped at an interface between the self-supporting adhesive layer and the rigid optical substrate.

The shapes of the microstructures in the adhesive layer may vary widely depending on the level of fluid egress and peel adhesion required for a particular application, as well as the surface properties of the substrate. Protrusions and depressions may be used, and the microstructures may be continuous to form grooves in the adhesive layer. Suitable shapes include hemispheres, right pyramids, trigonal pyramids, square pyramids, quadrangle pyramids, and "V" grooves, for reasons of pattern density, adhesive performance, and readily available methodology for producing the microstructures. The microstructures may be systematically or randomly generated.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the al to which the present invention is directed upon review of the instant specification.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| Additive Oil | RHODORSIL Fluid 47 V1,000, straight-chained polydimethylsiloxanic fluid of medium viscosity (1000 cps, 1.0 Pa s) commercially available from Rhodia Silicones, S. A. S., Lyon, France. |
| Cross-linking Additive | PERKADOX PD-50S-PS-A, 2,4-dichlorobenzoyl peroxide in Silicone oil, commercially available from Akzo Nobel Polymer Chemicals LLC, Chicago, IL. |
| PDMS diamine 33,000 | Approximately 33,000 molecular weight polydimethylsiloxane diamine prepared as described in Example 2 of U.S. Pat. No. 5,461,134. |
| DYTEK A | Organic diamine, commercially available from DuPont, Wilmington, DE. |
| H12MDI | Desmodur W, methylenedicyclohexylene-4,4'-diisocyanate, commercially available from Bayer, Pittsburgh, PA. |
| Primed PET | Aminated-polybutadiene primed polyester film of polyethylene terephthalate having a thickness of 38 micrometers. |
| Unprimed PET | Unprimed polyester film of polyethylene terephthalate having a thickness of 50 or 125 micrometers. |
| 33K MAUS | Methacryloxyurea siloxane, a difunctional silicone acrylate prepared from PDMS diamine 33,000 as described in U.S Pat. No. 5,514,730 column 14 for 35K MAUS. |
| IOA | Iso-octyl acrylate |
| DAROCUR 1173 | Photoinitiator: 2-hydroxy-2-methyl-1-phenyl-propan-1-one from Ciba Specialty Chemicals, Hawthorne, NY. |
| PDMS diamine 5,000 | A polydimethylsiloxane diamine with an average molecular weight of about 5,000 g/mole that was prepared as described in U.S. Pat. No. 5,214,119. |

-continued

Table of Abbreviations

| Abbreviation or Trade Designation | Description |
| --- | --- |
| EDA | Ethylene diamine |
| HDA | 1,6-hexane diamine |
| XDA | m-xylene diamine |

Test Methods

Luminous Transmittance (Visible Light Transmittance), Haze and Clarity

The luminous transmittance and haze of all samples were measured according to American Society for Testing and Measurement (ASTM) Test Method D 1003-95 ("Standard Test for Haze and Luminous Transmittance of Transparent Plastic") using a TCS Plus Spectrophotometer from BYK-Gardner Inc. Silver Springs. Md. Transmittance and Reflectance spectra of the sample were measured using a Perkin-Elmer Lambda 9 spectrophotometer. The tests were run on laminates prepared from the adhesive sample between PET (50 micrometers) and glass. The same instrument and laminates were also was used to measure Clarity.

180° Peel Adhesion

This peel adhesion test is similar to the test method described in ASTM D 3330-90, substituting a glass substrate for the stainless steel substrate described in the test.

Adhesive coatings on polyester film were cut into 1.27 centimeter by 115 centimeter strips. Each strip was then adhered to a 10 centimeter by 20 centimeter clean, solvent washed glass coupon using a 2-kilogram roller passed once over the strip. The bonded assembly dwelled at room temperature for 1 week or at 70° C. for 1 week. The samples were tested for 180° peel adhesion using an IMASS slip/peel tester (Model 3M90, commercially available from Instrumentors Inc. Strongsville, Ohio) at a rate of 2.3 meters/minute (90 inches/minute) over a five second data collection time. Two samples were tested; the reported peel adhesion value is an average of the peel adhesion value from each of the two samples. Data was collected in units of grants per inch (g/in) and converted to Newtons per decimeter (N/dm).

Speed of Wetting Test

Samples coated on Primed PET were tested for ease of lamination by laminating to a glass substrate, observing the rate of wetting and ranking the speed of wetting on a 1 to 5 scale. On this scale "1" is the lowest rate of wetting and "5" is the highest rate of wetting.

Rigid-to-Rigid Lamination Wet-Out Test

The samples of adhesive coated on Primed PET were tested for glass-to-glass lamination in a multilayer laminate. To the Primed PET side of the sample construction of Unprimed PET liner/example adhesive/Primed PET was laminated an optically clear, dual-liner, transfer adhesive (3M Optically Clear Laminating Adhesive 8141 commercially available from 3M Company. St. Paul, Minn.) to form a construction of: transfer adhesive liner/transfer adhesive/Primed PET/example adhesive/Unprimed PET liner. The transfer adhesive liner was removed and the construction was laminated to a glass slide with an area of 5.0 centimeters×7.6 centimeters (2 inches×3 inches) and a thickness of 1 millimeter. The Unprimed PET liner was removed and the example adhesive was placed on piece of glass with an area of 15 centimeters×20 centimeters (6 inches×8 inches) and a thickness of 1 millimeter. The construction was not pressed down with the fingers or laminated with a roller. The example adhesive was allowed to wet-out and auto-laminate under gravity. If wet-out initiated spontaneously, then the sample was rated "Yes" for Rigid to Rigid Laminate Wet-Out. If wet-out did not initiate within 1 minute, then one edge of the glass slide was pressed down with a finger to attempt to initiate a wetting front. If wet-out then initiated, then the sample was rated "Yes" for Rigid to Rigid Laminate Wet-Out. If little or no wet-out occurred after 5 minutes, even after finger pressure was applied to an edge of the glass slide, then the sample was rated "No" for Rigid to Rigid Laminate Wet-Out. If it was observed that wet-out initiated but was interrupted due to dirt particulate, coating thickness variations or other anomalies then the sample was rated as "Yes" for Rigid to Rigid Laminate Wet-Out.

Preparative Example 1

Synthesis of Silicone Polyurea (SPU) Elastomer

In a reaction vessel PDMS diamine 33,000, DYTEK A, H12MDI were placed in a mole ratio of 1:1:2 in sufficient 2-propanol to give a 20% solids solution. The mixture was stirred for 2 hours to give a silicone polyurea elastomer.

Preparative Example 2

Synthesis of Silicone Polyoxamide Elastomer Precursor

Diethyl oxalate (241.10 grams) was placed in a 3 liter, 3-neck resin flask equipped with a mechanical stirrer, heating mantle, nitrogen inlet tube (with stopcock), and an outlet tube. The flask was purged with nitrogen for 15 minutes and PDMS diamine 5,000 (2,028.40 grams, molecular weight equal to 4,918 g/mole) was added slowly with stirring. After 8 hours at room temperature, the reaction flask was fitted with a distillation adaptor and receiver. The contents were stirred and heated to 150° C. under vacuum (133 Pascals, 1 Torr) for 4 hours, until no further distillate was able to be collected. The remaining liquid was cooled to room temperature to provide 2,573 grams. Gas chromatographic analysis of the clear, mobile liquid showed that no detectable level of diethyl oxalate remained. Molecular weight was determined using $^1$H NMR (molecular weight equal to 5,477 grams/mole) and by titration (equivalent weights of 2.722 grams/equivalent and 2.721 grams/equivalent for two samples titrated).

Preparative Example 3

Synthesis of Silicone Polyoxamide HDA Elastomer

The precursor of Preparative Example 2 (793.20 grains) was placed in a 3 liter, 3-neck resin flask equipped with a mechanical stirrer heating mantle, nitrogen inlet tube (with stopcock), and an outlet tube. The flask was purged with nitrogen for 15 minutes and HDA (17.48 grams) was added.

The mixture was mechanically stirred and heated to 150° C. under a nitrogen atmosphere for 3.5 hours. The viscous molten product was poured into a glass tray and allowed to cool, the solid product was dissolved in THF (1,620 grams).

Preparative Example 4

Synthesis of Silicone Polyoxamide EDA Elastomer

The precursor of Preparative Example 2 (100.00 grams) was placed in a wide mouth jar. EDA (1.0243 grams) was added. The jar was sealed and the mixture was rapidly agitated until the contents became too viscous to flow. After sitting overnight at ambient temperature, the solid product was dissolved in THF (200 grams).

Preparative Example 5

Synthesis of Silicone Polyoxamide HDA Elastomer

The precursor of Preparative Example 2 (100.00 grams) and XDA (2.32 grams) were weighed into a jar. The jar was sealed and the mixture was rapidly agitated until the contents became too viscous to flow. The jar was placed on a roller mill overnight at ambient temperature. The solid product was dissolved in THF (200 grams).

Examples 1-3 and Comparative Example C1

For examples 1-3 silicone polyurea elastomer adhesives were prepared by blending the silicone polyurea elastomer prepared above with Additive Oil and Cross-linking Additive using conventional solvent means, at 20% solids. For Comparative Example C1 no Additive Oil or Cross-linker Additive was used. These samples were coated from the solvent mixture onto Primed PET and dried to 25 micrometers thickness and cured as described in Table 1. The samples were tested for 180° Peel according to the test method above, after aging 1 week at room temperature or 70° C. These data are summarized in Table 2. The samples were also tested using the Speed of Wetting and Rigid to Rigid Lamination Wet Out Tests described above and the data are presented in Table 2. For Example 2, Luminous Transmittance, Haze and Clarity were measured using the test method above, the data are presented in Table 6.

TABLE 1

| Example | Cure Conditions | SPU Elastomer (wt %) | Additive Oil (wt %) | Cross-linking Additive (wt %) |
| --- | --- | --- | --- | --- |
| 1 | 8 hour cure at 80° C. | 59.5 | 40 | 0.5 |
| 2 | 5 minute cure at 120° C. | 59.5 | 40 | 0.5 |
| 3 | 6 minute cure at 150° C. | 59.5 | 40 | 0.5 |
| C1 | 30 minute drying at 90° C. | 100 | 0 | 0 |

TABLE 2

| Example | 180° Peel Adhesion after 1 Week at Room temperature (N/dm) | 180° Peel Adhesion after 1 Week at 70° C. (N/dm) | Speed of Wetting | Rigid-to-Rigid Lamination Wet-Out |
| --- | --- | --- | --- | --- |
| 1 | 0.385 | 0.963 | 5 | Yes |
| 2 | 1.39 | 0.878 | 5 | NT |
| 3 | 1.39 | 0.785 | 5 | NT |
| C1 | 2.57 | 15.15 | 1 | No |

NT = Not Tested

Examples 4-5 and Comparative Examples C2-C3

For examples 4-5 and Comparative Example C2-C3 silicone acrylate adhesives were prepared by blending the 33K MAUS, IOA and Additive Oil in the ratios shown in Table 3 with 1 weight % DAROCUR 11173. Samples of these formulations were coated to Primed PET film and covered with Unprimed PET film (used as a release liner) and cured for 15 minutes under 350 nm, low intensity UV lights. The Speed of Wetting and Rigid to Rigid Lamination Wet Out Tests were carried out as described in the Test Methods above. The data are summarized in Table 3.

TABLE 3

| Example | 33K MAUS (wt %) | IOA (wt %) | Additive Oil (wt %) | Speed of Wetting | Rigid-to-Rigid Lamination Wet-Out |
| --- | --- | --- | --- | --- | --- |
| 4 | 39.5 | 39.5 | 20 | 5 | Yes |
| 5 | 34.5 | 34.5 | 30 | 5 | Yes |
| C2 | 49.5 | 49.5 | 0 | 5 | No |
| C3 | 44.5 | 44.5 | 10 | 5 | No |

Examples 6-8

For examples 6-8 silicone polyoxamide elastomer adhesives were prepared by blending the silicone polyoxamide elastomers prepared as described in the preparative examples above with Additive Oil and Cross-linking Additive using conventional solvent means, at 20% solids. For Example 6 the silicone polyoxamide elastomer was the HDA elastomer prepared in Preparative Example 3', for Example 7 the silicone polyoxamide elastomer was the EDA elastomer prepared in Preparative Example 4, for Example 8 the silicone polyoxamide elastomer was the XDA elastomer prepared in Preparative Example 5. These samples were coated from the solvent mixture onto Primed PET and dried to 25 micrometers thickness and cured as described in Table 4. The samples were tested for 180° Peel according to the test method above, after aging 3 days at room temperature or 70° C. These data are summarized in Table 5. The samples were also tested using the Speed of Wetting Test described above and the data are presented in Table 5. Luminous Transmittance, Haze and Clarity were measured using the test method above, the data are presented in Table 6.

TABLE 4

| Example | Cure Conditions | Silicone Polyoxamide Elastomer (wt %) | Additive Oil (wt %) | Cross-linking Additive (wt %) |
|---|---|---|---|---|
| 6 | 5 minute cure at 120° C. | 59.5 | 40 | 0.5 |
| 7 | 5 minute cure at 120° C. | 59.5 | 40 | 0.5 |
| 8 | 5 minute cure at 120° C. | 59.5 | 40 | 0.5 |

TABLE 5

| Example | 180° Peel Adhesion after 3 days at Room temperature (N/dm) | 180° Peel Adhesion after 3 days at 70° C. (N/dm) | Speed of Wetting |
|---|---|---|---|
| 6 | 6.77 | 1.54 | 5 |
| 7 | 1.39 | 9.76 | 5 |
| 8 | 1.39 | 2.85 | 5 |

TABLE 6

| Example | Average Luminous Transmission (%) | Average Haze (%) | Average Clarity (%) |
|---|---|---|---|
| 2 | 91.43 | 2.44 | 99.3 |
| 6 | 91.17 | 5.95 | 99.1 |
| 7 | 91.20 | 4.32 | 99.3 |
| 8 | 91.00 | 4.78 | 99.3 |

Example 9

For Example 9 a silicone acrylate adhesive was prepared by blending the 33K MAUS, IOA and Additive Oil in the ratio shown in Table 7 with 1 weight % DAROCUR 1173, using the same formulation as for Comparative Example C3. A sample of this formulation was coated to Primed PET film and covered with Unprimed PET film (used as a release liner) and cured for 15 minutes under 350 mm, low intensity UV lights. The sample was tested for Speed of Wetting. The data are shown in Table 7. A modified Rigid to Rigid Lamination Wet-Out Test was run in that the glass plate to which the example adhesive was laminated was pre-treated with a thin layer of Additive Oil. The additive Oil was applied by wiping on a thin layer and scraping off excess oil with a razor blade to give a uniform, thin coating. The data are summarized in Table 7.

TABLE 7

| Example | 33K MAUS (wt %) | IOA (wt %) | Additive Oil (wt %) | Speed of Wetting | Rigid-to-Rigid Lamination Wet-Out |
|---|---|---|---|---|---|
| C3 | 44.5 | 44.5 | 10 | 5 | No |
| 9 | 44.5 | 44.5 | 10 | 5 | Yes* |

*Using the modified Rigid to Rigid Wet-Out Test

We claim:

1. An optical article comprising:
a first rigid optical substrate;
a second rigid optical substrate; and
a self-supporting optical adhesive disposed between the first rigid substrate and the second rigid substrate, the self-supporting optical adhesive comprising a cross-linked silicone based polymer network and a silicone fluid disposed in the polymer network.

2. An optical article according to claim 1 wherein the cross-linked silicone based polymer network comprises a silicone polyurea elastomer.

3. An optical article according to claim 1 wherein the cross-linked silicone based polymer network comprises a silicone polyacrylate.

4. An optical article according to claim 1 wherein the cross-linked silicone based polymer network comprises silicone polyoxamide elastomer.

5. An optical article according to claim 1 wherein the self-supporting optical adhesive comprises 20 to 50% wt silicone fluid.

6. An optical article according to claim 1 wherein the self-supporting optical adhesive comprises 50 to 80% wt silicone elastomer.

7. An optical article according to claim 1 wherein the first rigid optical substrate and the second rigid optical substrate comprises glass or quartz.

8. An optical article according to claim 1 wherein the optical article has a haze value of less than 5% and a visible light transmittance of 90% or greater when measured according to ASTM Test Method D 1003-95.

9. An optical article according to claim 1 wherein the self-supporting optical adhesive is disposed on a first side of an optical film and a second optical adhesive is disposed on a second side of the optical film, wherein the second side opposes the first side of the optical film.

10. An optical article according to claim 9 wherein the self-supporting optical adhesive is a permanently repositionable optical adhesive and the second optical adhesive is a structural adhesive.

11. An optical article according to claim 1 wherein the second rigid optical substrate forms at least a portion of a liquid crystal display panel.

12. An optical article according to claim 1 wherein the first rigid optical substrate forms at least a portion of a transparent sensor panel.

13. An optical article according to claim 1 wherein the first rigid optical substrate forms at least a portion of a transparent sensor panel and the second rigid optical substrate forms at least a portion of a liquid crystal display panel.

14. A method of forming an optical article comprising:
providing a first rigid optical substrate having a surface and a self-supporting optical adhesive layer disposed adjacent the surface, the self-supporting optical adhesive comprises a cross-linked silicone based polymer network and a silicone fluid disposed in the polymer network; and
laminating a second rigid substrate onto the self-supporting optical adhesive layer to form an optical article, wherein the self-supporting optical adhesive layer is disposed between the first rigid optical substrate and the second optical substrate.

15. A method according to claim 14 wherein the providing step further comprises an optical film disposed on the self-supporting optical adhesive layer and a second optical adhesive layer disposed on an opposing surface of the optical film, wherein the second optical adhesive is disposed between the optical film and the first rigid substrate.

16. A method according to claim 14 wherein the laminating step comprises laminating a second rigid substrate, comprising a liquid crystal display panel, onto the self-supporting optical adhesive layer to form an optical article.

17. A method according to claim 14 wherein the providing step comprises providing a first rigid optical substrate comprising a transparent sensor panel.

18. A method according to claim 14 further comprising delaminating the first rigid substrate and the self-supporting optical adhesive layer from the second rigid substrate.

19. A method according to claim 18 further comprising providing a replacement first rigid optical substrate having a surface and a self-supporting optical adhesive layer disposed adjacent the surface, the self-supporting optical adhesive comprises a cross-linked silicone based polymer network and a silicone fluid disposed in the polymer network, and then laminating the second rigid substrate onto the replacement first rigid optical substrate self-supporting optical adhesive layer to form a repaired optical article, wherein the replacement first rigid optical substrate self-supporting optical adhesive layer is disposed between the replacement first rigid optical substrate and the second optical substrate.

20. A method according to claim 14 wherein the providing step further comprises providing a self-supporting optical adhesive layer having a microstructured adhesive surface.

* * * * *

UNITED STATES PATENT AND TRADEMARK OFFICE
CERTIFICATE OF CORRECTION

PATENT NO.       : 7,655,283 B2                                        Page 1 of 1
APPLICATION NO. : 11/426844
DATED            : February 2, 2010
INVENTOR(S)      : Sherman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-third Day of November, 2010

David J. Kappos
*Director of the United States Patent and Trademark Office*